United States Patent [19]

Haller et al.

[11] Patent Number: 4,711,991

[45] Date of Patent: Dec. 8, 1987

[54] COUNTING APPARATUS

[75] Inventors: Andreas Haller; Werner Pfundstein, both of VS-Schwenningen; Heinrich Hall, VS-Villingen, all of Fed. Rep. of Germany

[73] Assignee: IVO Irion & Vosseler Zahlerfabrik GmbH & Co., Schwenningen, Fed. Rep. of Germany

[21] Appl. No.: 1,222

[22] Filed: Jan. 7, 1987

[30] Foreign Application Priority Data

Jan. 15, 1986 [DE] Fed. Rep. of Germany ... 8600748[U]

[51] Int. Cl.⁴ .............................................. G06F 15/18

[52] U.S. Cl. ............................ 235/132 E; 235/91 M; 235/133 A

[58] Field of Search ............ 235/91 M, 132 E, 133 A, 235/137, 144 E, 144 ME

[56] References Cited

U.S. PATENT DOCUMENTS

| | | | |
|---|---|---|---|
| 3,311,299 | 3/1967 | Stautmeister | 235/144 ME |
| 3,935,433 | 1/1976 | Cielaszyk et al. | 235/91 M X |
| 4,197,452 | 4/1980 | Sato | 235/132 E X |
| 4,433,234 | 2/1984 | Kubler | 235/132 E |

*Primary Examiner*—B. R. Fuller

*Attorney, Agent, or Firm*—Mason Fenwick & Lawrence

[57] ABSTRACT

A counting apparatus comprising a drum counting mechanism and a step motor for driving the drum counting mechanism. A housing for the drum counting mechanism includes a wall which forms a part of the housing for the step motor, the step motor including a rotor with a rotor shaft, which shaft extends through the wall. The step motor includes a stator coil which is supported on an extending portion of the housing for the step motor. Alternatively, a bearing and flange unit may be provided which extends through an opening in the common wall and which may have an extending portion on which the stator coil is mounted in surrounding relationship.

7 Claims, 5 Drawing Figures

COUNTING APPARATUS

BACKGROUND OF THE INVENTION

This invention relates to a counting apparatus, and more particularly, to a counting apparatus including a drum counting mechanism and a step motor drive for driving the drum counting mechanism.

Counting apparatus are well known which are comprised of a preassembled counter mechanism and a preassembled step drive motor for the counter mechanism. Typically, the step motor includes a housing having a flange on it by which it is joined to the housing of the counter mechanism in order to connect the two components together. Typically, each of these two components, that is, the drum counting mechanism and the step motor, is produced and installed in its own housing, and typically, each housing comprises two parts which are joined together. Such construction requires the use of multiple parts, is of greater weight than is necessary and requires substantial manufacturing costs to first produce each component within its own housing and to then join the two housings together to form a completed unit. Also, the yoke of the step motor is made of plural elements, some of which are required to be inserted into each end of an opening in a support for the stator coil of the step motor.

SUMMARY OF THE INVENTION

A counting apparatus is provided which includes a drum counting mechanism within a housing and a step motor for driving the drum counting mechanism, with a wall of the housing for the drum counting mechanism forming a wall of the housing for the step motor. The drum counting mechanism in the illustrative arrangement herein disclosed comprises a gear and a plurality of rotatable indicating drums, one of the drums being drivingly connected to the gear; switch drives are provided for decadic indexing of subsequent indicating drums. The step motor includes a stator coil, a magnet yoke and a rotor having a rotor shaft driven by the magnet yoke; a gear on the rotor shaft is meshed with the gear of the drum-counting mechanism. The rotor shaft extends through the above-noted common wall, and the housing of the step motor has an extension on which the stator coil is coaxially mounted. The rotor shaft may be journalled in the noted wall of the housing or the bearing part of a bearing and flange element may pass through the wall and the rotor shaft may be journalled in it. In an alternate embodiment, the stator coil may be mounted coaxially on an extending portion of the bearing and flange element.

Among the objects of the present invention are the provision of a counting apparatus which is of economical construction, which can be assembled with minimum steps and which has a reduced number of components. Another object of the present invention is to provide an economical counting apparatus as hereinabove discussed which is of simple construction requiring fewer parts.

Another object of the present invention is the provision of a counting apparatus in which a step motor for driving a counting mechanism is positioned remotely from a display window for count indicating elements, so as to diminish the risk of tampering with the counter reading from the outside of the apparatus.

DESCRIPTION OF THE PREFERRED EMBODIMENTS

Figure 1:
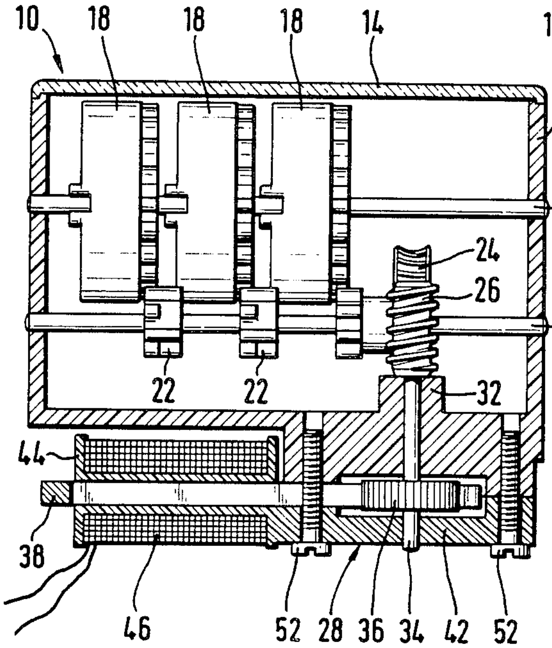
FIG. 1 is a cross-sectional view of a counting apparatus in accordance with the present invention.
Figure 2:
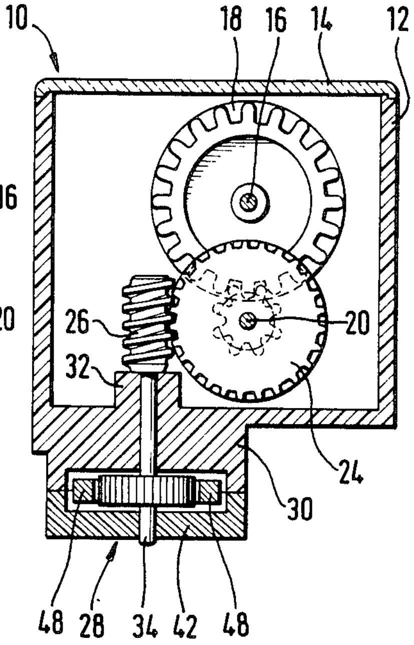
FIG. 2 is a cross-sectional view taken transverse to that of FIG. 1 through the rotor shaft forming a part of the counting apparatus of FIG. 1.

Referring now to FIGS. 1 and 2, there is shown a counting apparatus in accordance with the present invention and comprising a counter housing 12 within which is a drum counting mechanism. The counter housing 12 has an upper open side which is closed by a display window 14. Within the housing 12, there is provided a counting mechanism which as is specifically illustrated, is of the drum counting type. The drum counting mechanism includes indicating drums 18, three of which are illustrated herein. Indicating drums 18 provide for the display of indicia such as numerals (not shown), and are rotatably mounted on a transverse shaft 16. A second shaft 20 is provided on which are mounted decadic indexing switching drives 22. The first or right-hand indicating drum 18 is driven by a worm wheel 24 mounted on the shaft 20, worm wheel 24 being in mesh with and driven by the driving worm 26. Worm 26 is secured to drive shaft 34 forming a part of a step motor.

Figure 3:
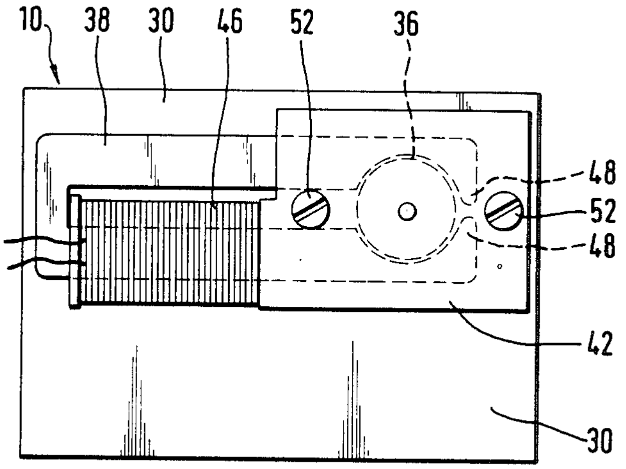
FIG. 3 is a bottom plan view of the counting apparatus of FIG. 1.

The housing 12 comprises a wall 30 which is opposite to the display window 14. The wall 30 forms a part of the housing of the step motor 28, as well as being a part of the housing 12 for the counter and is therefor common to both of these components. Wall 30 has a bore through which extends the drive shaft 34 of the step motor 28. Due to the lug 32 which extends from the wall 30, the length of the bore for drive shaft 34 is increased. As will be seen from FIGS. 1 and 2, a recess is provided in the underside of wall 30, and in this recess, there is positioned a rotor 36 of the step motor 28, the drive shaft or rotor shaft 34 being in the rotor 36 and drivingly connected to it. Also within or partly within the above-noted recess in wall 30 are pole shoes 48 forming a part of magnet yoke 38, which is of generally U-shape as shown in FIG. 3. A cover shell 42 forms a part of the housing for the step motor 28 being secured by screws 52 threaded into bores 40 in the wall 30 of housing 12. As shown in FIGS. 1 and 2, the cover shell 42 has a bore which receives the rotor shaft 34 and thereby provides for journalling thereof.

In the embodiment of the invention shown in FIGS. 1–3, the cover shell 42 forming a part of the housing for step motor 28 has an integral laterally extending portion 44, the stator coil 46 of the step motor 28 being coaxially mounted thereon. As will be understood, coil 46 is mounted on the extension 44 prior to the assembly of the cover shell 42 to housing 12. The extension 44 has a longitudinally extending opening therethrough which communicates with the recess in which the rotor 36 is located. As shown in FIGS. 1 and 3, one leg of the generally U-shaped magnet yoke 38 is of a size and shape relative to the opening through the extension 44, so as to permit insertion thereof through the extension 44. As shown in FIG. 3, the ends of the legs of the magnet yoke 38 have symmetrical recesses which provide the aforementioned pole shoes 48. Thus, the pole shoes are in generally surrounding relationship to rotor 36. The cooperative dimensioning and shaping of the opening through extension 44 and leg of magnet yoke 38 permits assemblage of the magnet yoke 38 with stator coil 46 and rotor 36 very quickly, particularly in comparison with conventional step motors in which the magnet yoke was formed of several stator sheets which were inserted from both ends of a passage or bore within the stator coil.

The counting apparatus as shown in FIGS. 1-3 may be readily and economically assembled. For example, the stator coil 46 is mounted on the extension 44, after which a leg of the magnet yoke 38 is inserted through the opening in extension 44. Rotor 36 is then placed between pole shoes 48, and these parts, together with the shell 42, are pushed toward wall 30, rotor 36 being pushed onto the drive shaft 34 which, as will be understood, will have been previously positioned in the common wall 30. The screws 42 are then threaded into the bores 40 to complete the assembly.

Figure 4:
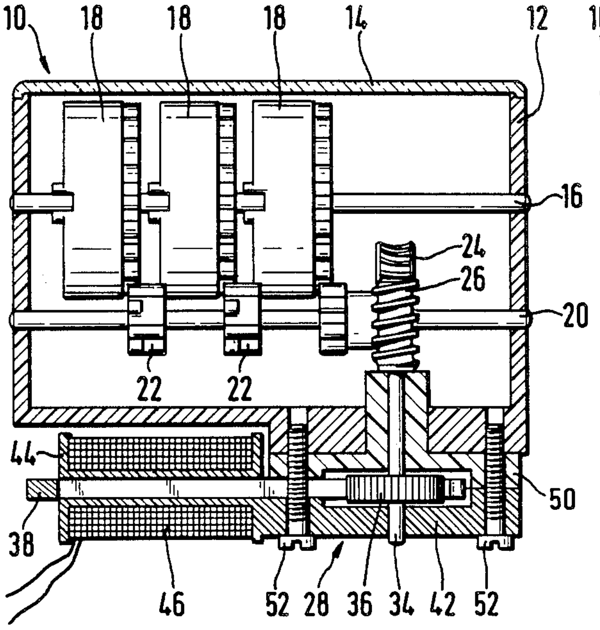
FIG. 4 is a cross-sectional view similar to FIG. 1 of an alternate embodiment of a counting apparatus according to the present invention.
Figure 5:
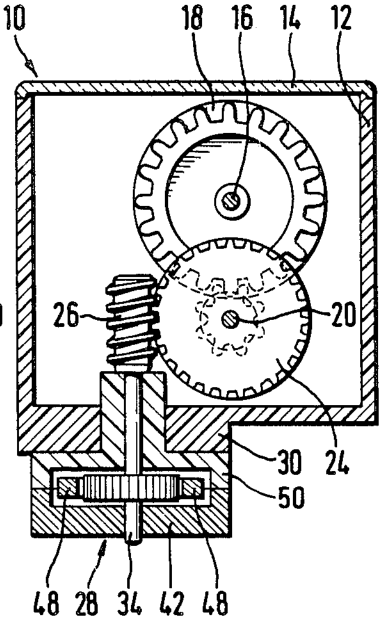
FIG. 5 is a cross-sectional view taken transversely to FIG. 4 through the rotor shaft shown therein.

Referring now to FIGS. 4 and 5, there may be seen an alternate embodiment of the counting apparatus in accordance with the present invention. Reference numerals shown thereon are used for the same or corresponding parts as in the embodiment of FIGS. 1-3. A bearing and flange element 50 is shown having a bearing part extending through an enlarged opening through wall 30, and having laterally extending flanges in engagement with the undersurface of wall 30. Bores penetrate the laterally extending flanges for receiving the screws 52. This construction provides for journalling of the rotor or drive shaft 34 of step motor 28 in a material different from housing 12. In this embodiment, the cover shell 42 has substantially the same size and shape as in the embodiment of FIGS. 1-3.

In an alternate construction, the extension 44 on which the stator coil 46 is coaxially mounted may extend from, and be a part of, the bearing and flange element 50.

The simplicity and economy of the embodiment shown in FIGS. 4 and 5 and referred to above is substantially the same as that of the embodiment of FIGS. 1-3, there being obtained the advantage of better journalling of the shaft 34 through the addition of the bearing and flange element 50.

It will be obvious to one skilled in the art that various changes may be made without departure from the spirit of the invention, and therefore the invention is not limited to that shown in the drawings and described in the specification, but only as indicated in the appended claims.

We claim:

1. A counting apparatus comprising:

(a) a drum counting mechanism comprising a gear, rotatable indicating drums,
the gear drivingly connected with one of said drums, and
switching drives for decadic indexing of other indicating drums;

(b) a step motor for driving said counting apparatus including a stator coil,
a magnet yoke,
a rotor driven by said magnet yoke and having a rotor shaft,
means drivingly connecting said rotor shaft to said gear, and (c) a housing for said drum-counting mechanism including a wall, said wall forming a part of a housing for said step motor, another part of the step motor housing having an extending portion, said stator coil being around and on said extending portion.

2. The counting apparatus of claim 1, wherein said magnet yoke comprises a pair legs having pole shoes thereon, said housing having an opening therethrough of sufficient size and shape to permit insertion therethrough of at least one of said legs of said magnet yoke.

3. The counting apparatus of claim 1, said housing comprising a display window for displaying said indicating drums, said wall of said housing being opposite said display window.

4. The counting apparatus of claim 1, wherein said rotor shaft extends through said wall of said housing.

5. The counting apparatus of claim 1, wherein said wall of said housing has an enlarged opening therein, a bearing and flange element having a bearing part extending through said opening, and having the flange thereof in engagement with said wall, said bearing part having an opening therethrough and said rotor shaft being journalled in said opening of said bearing part.

6. A counting apparatus comprising:

(a) a drum counting mechanism comprising a gear, rotatable indicating drums,
the gear drivingly connected with one of said drums, and
switching drives for decadic indexing of other indicating drums;

(b) a step motor for driving said counting apparatus including a stator coil,
a magnet yoke,
a rotor driven by said magnet yoke and having a rotor shaft,
means drivingly connecting said rotor shaft to said gear; and (c) a housing for said drum-counting mechanism including a wall, an opening through said wall, a bearing and flange element comprising a bearing part and a flange, the bearing part extending through said wall and the flange engaging said wall, said rotor shaft being journalled in said bearing part, a step motor housing, means securing said step motor housing and said element to said wall, an extending portion carried by a part secured to said wall, said stator coil being around and carried by said extending portion.

7. The counting apparatus of claim 6, wherein said extending portion is on said step motor housing.

* * * * *